United States Patent [19]

Fiala

[11] 4,246,778
[45] Jan. 27, 1981

[54] FUEL CONSUMPTION INDICATING INSTRUMENT

[75] Inventor: Ernst Fiala, Wolfsburg, Fed. Rep. of Germany

[73] Assignee: Volkswagenwerk Aktiengesellschaft, Fed. Rep. of Germany

[21] Appl. No.: 40,122

[22] Filed: May 18, 1979

[30] Foreign Application Priority Data

May 24, 1978 [DE] Fed. Rep. of Germany ....... 2822664

[51] Int. Cl.³ .............................................. G01F 9/00
[52] U.S. Cl. .................................................. 73/114
[58] Field of Search .......................... 73/115, 116, 114

[56] References Cited

U.S. PATENT DOCUMENTS

| | | | |
|---|---|---|---|
| 3,930,408 | 1/1976 | Kadota | 73/114 |
| 3,977,238 | 8/1976 | Byington, Jr. | 73/115 X |

FOREIGN PATENT DOCUMENTS 7242452 9/1976 Fed. Rep. of Germany .

*Primary Examiner*—Jerry W. Myracle
*Attorney, Agent, or Firm*—Brumbaugh, Graves, Donohue & Raymond

[57] ABSTRACT

A system for indicating the fuel consumption rate of a vehicle, wherein there is provided a pressure responsive instrument for indicating consumption rate which is connected by a pressure conduit to the intake passage of the engine, is provided with a pressure transformer in the conduit. The transformer is responsive to the operating condition of the vehicle transmission, and operates when the transmission is in its next highest gear to convert the negative pressure of the engine intake passage to a lower value of negative pressure which is presented to the indicating instrument. The conversion is by a pressure ratio equal to the ratio of the highest transmission gear to the next highest gear.

13 Claims, 4 Drawing Figures

FUEL CONSUMPTION INDICATING INSTRUMENT

BACKGROUND OF THE INVENTION

This invention relates to a system for indicating fuel consumption rate in a vehicle driven by an internal combustion engine through a multi-speed transmission, and particularly to such systems wherein fuel consumption rate is displayed for vehicle operation both in the highest transmission gear and in the next highest transmission gear.

There is known to be an approximately linear relationship between the vacuum pressure in the intake passage of a gasoline engine and the fuel consumption rate per distance travelled for the vehicle, when the vehicle is operating in the highest gear of its transmission. This relationship is substantially linear over a wide range of engine speed and load conditions. This range is an adequate range to provide fuel consumption rate information derived from intake pressure to a vehicle operator in order to enable him to achieve fuel economy during vehicle operation. While the range of linear fuel consumption rate indication does not include periods of high fuel consumption, for example when the vehicle is accelerating, or when the engine is idling, these engine conditions are generally not sustained over a long period of time and consequently do not have a substantial impact on overall fuel consumption. For practical purposes, it is sufficient to provide a display of fuel consumption rate for a gasoline engine driven vehicle over a relatively narrow range of engine operating conditions, corresponding, for example, to intake vacuum pressures of between two and six meters of a water column. Such consumption rate can be conveniently displayed in liters per one-hundred kilometers or other measure of efficiency.

The linear relation between fuel consumption and intake vacuum pressure is valid for only a single operating gear of the vehicle. If it is desirable to indicate fuel consumption rate for operation of a vehicle in other than the highest vehicle gear, for example, the next highest gear, a different linear relation between fuel consumption and vacuum pressure exists. Lower gears, for example, first and second gear, or reverse gear, in a four speed transmission, are generally used only for brief periods of time, and operation in these gears does not contribute significantly to overall vehicle fuel consumption. Therefore, there is no valid reason for displaying fuel consumption rate when these gears are being used.

It is an object of the present invention to provide a new improved system for indicating vehicle fuel consumption rate.

It is a further object of the invention to provide such a system which provides an indication of fuel consumption rate during vehicle operation in the second highest gear as well as during vehicle operation in the highest gear.

It is a further object of the invention to provide such a system which makes use of a single instrument for displaying the fuel consumption rate in the highest and second highest gear.

SUMMARY OF THE INVENTION

In accordance with the invention there is provided an improvement in a system for indicating the fuel consumption rate of a vehicle driven by an internal combustion engine through a multi-speed transmission. Such system includes a pressure responsive instrument for indicating the consumption rate. The instrument is connected by a pressure conduit to an intake passage of the engine at a position of the passage following a throttle valve in the direction of intake flow. In accordance with the invention, there is provided a pressure transformer in the conduit, which is responsive to the operating condition of the transmission to operate when the transmission is in its next highest gear to convert the negative pressure of the intake passage to a lower value of negative pressure to be presented to the indicating instrument, the conversion is by a pressure ratio equal to the ratio of the highest gear in the transmission to the next highest gear in the transmission.

In an preferred embodiment, the pressure transformer comprises a cylinder and a piston axially slidable within the cylinder and forming a first pressure chamber connected by the conduit to the intake passage and a second chamber connected by the conduit to the indicating instrument. The piston has first and second surfaces which form boundaries of the respective chambers, the surfaces have area ratios corresponding to the gear ratio. There are also provided passages, including an annular channel on the piston, for connecting the second chamber with the first chamber upon deflection of the piston in a first direction from an equilibrium position and for connecting the second chamber to the surrounding atmosphere upon deflection of the piston in a second direction from the equilibrium position. The annular channel is usually connected to the second chamber, and the cylinder is provided with a step-like enlargement in its inner diameter in the first chamber, the chamber enlargement communicates with the annular channel on movement of the piston from the equilibrium position toward the first chamber. There is also provided an atmospheric vent on the cylinder communicating with the annular channel on movement of the piston from the equilibrium position toward the second chamber. The first surface of the piston can be in the form of an annular ring surrounding a piston extension which passes through an end wall of the cylinder. The extension can be acted on upon engaging of the highest gear of the transmission to move the piston to a position wherein the annular channel connects the first and second chambers and wherein the piston blocks the atmospheric vent. The extension can also be acted upon by the transmission to move the piston to a position wherein the annular channel connects the second chamber to the atmospheric vent and the piston seals the first chamber, when the transmission is not in the highest or the second highest gear.

In an easily fabricated embodiment of the invention, the cylinder includes first and second pot-shaped members which enclose the first and second chambers and includes an intermediate toroidal member with a T-shaped cross-section. The toroidal member has an inwardly facing circular web portion projecting between the pot-shaped members. The toroidal member can be connected to the pot-shaped members by snap connections and there may be provided sealing rings between the edges of the pot-shaped members and the circular web portion of the toroidal member. The toroidal member may include an atmospheric vent for communicating with the annular channel of the piston in selected positions of the piston. The first pot-shaped member can be provided with a bore at one axial end accommodating the piston extension and there may be provided a recess surrounding the bore and accommodating an O-ring seal. There may also be provided an insert covering the O-ring and extending along the inner wall of the pot-shaped member to the toroidal member. The pot-shaped members and toroidal members can all comprise injection molded parts.

For controlling the pressure transformer there may be provided first control means acting on the piston extension for elastically urging the piston into a position wherein the second pressure chamber is vented to the atmosphere. There may also be provided second control means coupled to the transmission for disengaging the first control means when the transmission is in its highest gear and for moving the piston into a position connecting the first and second chambers when the transmission is in the highest gear. The first control means may include a first lever acting under a spring force and connected to said piston extension and the second control means can include second and third levers coupled by articulation, the second lever acting to support the first lever and the third lever acting on the piston extension.

Thus, the invention provides for a pressure indication while the highest gear is engaged which is decreased relative to the indication which results from the same pressure in the intake passage when the next lower gear is engaged, so that the same pressure gauge indicating the instrument can be used for indicating fuel consumption in the highest and next highest gear. There need only be provided an additional scale or an extension of the scale for the lower gear in order to use the same instrument for indication of fuel consumption in both gears.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
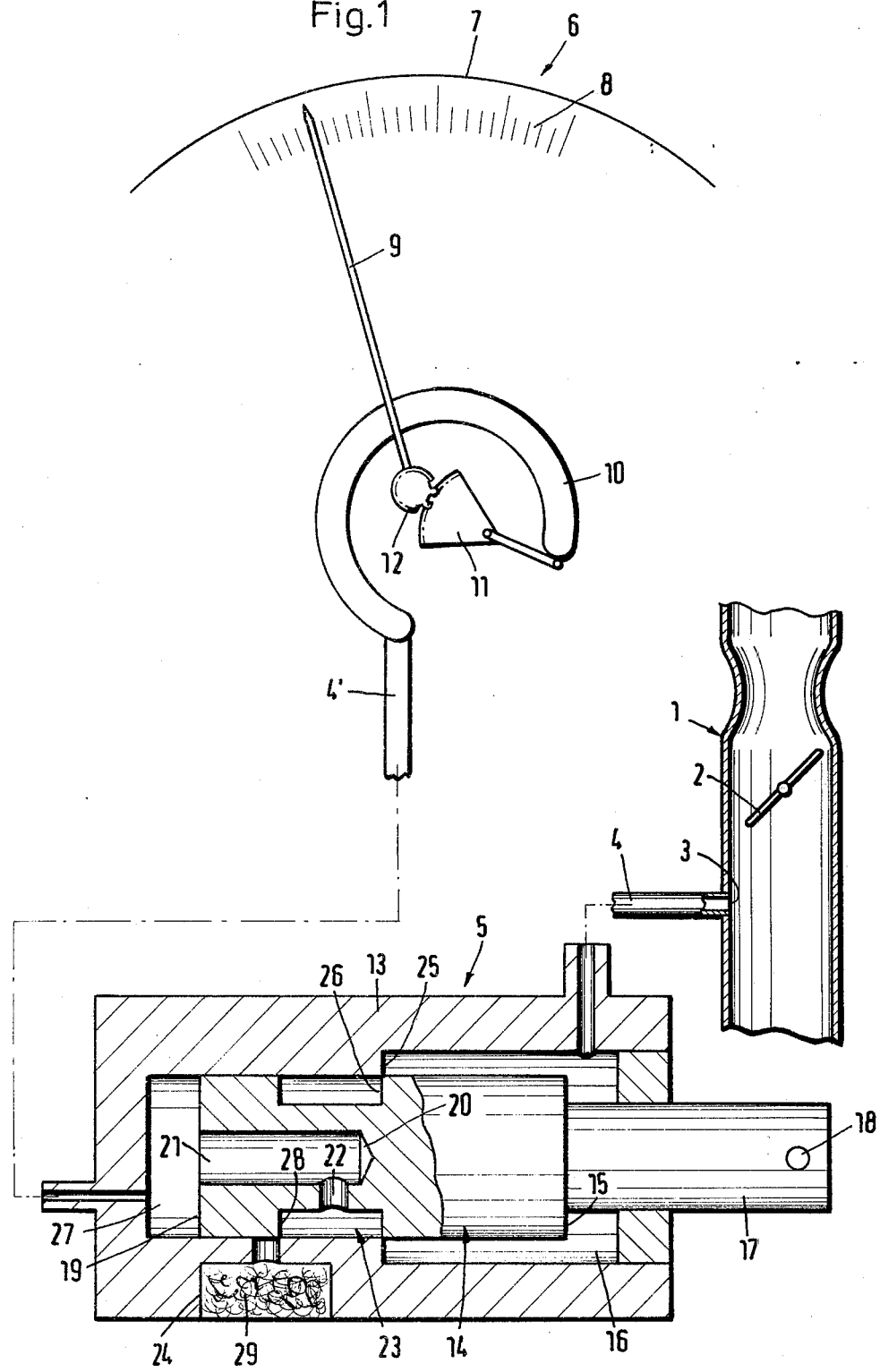
FIG. 1 is a partially schematic and partially cross-sectioned illustration of a fuel consumption rate indicating system having a pressure transformer in accordance with the present invention.

FIG. 1 illustrates a system having a pressure transformer in accordance with the present invention. The system is operative with an internal combustion engine, such as a gasoline engine, which is used to operate a motor vehicle having a multiple speed transmission. The system indicates the rate of fuel consumption of the vehicle as a function of distance travelled. The system includes a conduit 4, which is connected by a bore 3 to the intake passage 1 of the internal combustion engine at a point which is spaced from the throttle 2 in the direction of intake flow. Conduit 4 conducts the negative vacuum pressure of the intake passage 1 to pressure transformer 5 and then by section 4' to an indicating instrument 6, which responds to supplied vacuum pressure and indicates the fuel consumption rate of the vehicle as a function of distance travelled, for example in liters per 100 kilometers. Instrument 6 includes a scale support 7, having a scale 8 for indicating fuel consumption which is swept by a needle 9. The instrument includes, as an operating mechanism, a Bourdon tube 10 which is connected by gear segment 11 and gear 12 to the pointer 9.

In accordance with the present invention, the system of FIG. 1 is supplied with a pressure transformer 5 in conduit 4 between intake passage 1 and indicating instrument 6. Pressure transformer 5 is operative when the vehicle transmission is in its next highest operating gear and acts to reduce the negative pressure supplied from intake passage 1 into a lower negative pressure which is presented to indicating instrument 6. The transformation of pressure is a reduction of the vacuum pressure by a ratio corresponding to the ratio of the highest gear to the second highest gear of the transmission.

As may be seen in the cross-sectional view of FIG. 1, pressure transformer 5 includes a cylinder 13 within which there is provided a piston 14 which is freely movable in the longitudinal direction of the cylinder when the highest gear of the transmission is engaged. Cylinder 13 includes at the right side a first chamber 16 which is in connection with intake passage 1 by conduit 4. Chamber 16 is bounded in part by an annular shaped end face 15 of piston 14. Surface 15 of piston 14 surrounds a piston extension 17 which projects through a bore in the end of cylinder 13. Piston extension 17 is sealed to the end wall of cylinder 13, but is freely movable therethrough in the longitudinal direction of piston 14. Extension 17 is provided with a mechanism, for example bore 18, for connecting the extension 17 to control elements, which are not shown in FIG. 1.

As a result of the provision of extension 17 the surface 15 of the piston which forms one wall of the first chamber 16, has a smaller surface area than the corresponding piston surfaces 19 and 20 which form the boundary of the second chamber 27. As a result of the differences in surface area of the piston end surfaces bounding the chambers, a lower absolute pressure (greater vacuum) in chamber 16 will balance the piston against the force of pressure in chamber 27.

Passages 21 and 22 which extend along the inside of piston 14 are in connection with an annular channel 23 formed on piston 14. In the position of piston 14 illustrated in the drawing, channel 23 is not in communication with either the first chamber 16 or a vent passage 24 to the surrounding atmosphere. Vent 24 is provided with filter material 29 to prevent dust or other particles from entering the system.

Assuming that intake passage 1 has a negative pressure with respect to atmospheric, as is the usual case for gasoline engines. A lowering of the absolute pressure level in intake passage 1 will be communicated to the first chamber 16 of the transformer 5 and will cause a displacement of piston 14 to the right from the equilibrium position shown. This displacement will cause the edge 26 of annular channel 23 to pass the edge 25 of the stepped portion of cylinder 13 and open a gap between edges 25 and 26 connecting the first and second chambers 16 and 27. The connection of the two pressure chambers 16 and 27 by means of annular channel 23, passage 22, and passage 21 will cause a lowering of the pressure in the second chamber 27 which will tend to bring the piston 14 back into the equilibrium position indicated, with a lower value of pressure in chamber 27 corresponding to the lowered value of the pressure in chamber 16.

Because of the differences in the surface areas of the piston 14 in the first and second pressure chambers 16 and 27, the prevailing pressure in chambers 16 and 27 which results in an equilibrium position of piston 14 will be different. Viewing the pressures in the respective chambers 16 and 27 as negative going pressures from atmospheric, the vacuum pressure in chamber 27 will be lower than the vacuum pressure in chamber 16 by the ratio of the area 15 to the combined area 19, 20. Since the area of the end face 15 of piston 14 is considerably smaller than the end face 19, 20 bounding pressure chamber 27, chamber 27 will have a lower vacuum pressure relative to atmospheric than the vacuum pressure in chamber 16. Thus, a lower value of vacuum pressure will be presented to the indicating instrument 6 than is present in the intake passage 1 of the internal combustion engine.

If the absolute pressure in the intake passage 1 increases, piston 14 will move to the left in the drawing and the edge 28 will free vent passage 24 to the outside atmosphere. Air will enter pressure chamber 27 from the atmosphere, and increase the absolute pressure in pressure chamber 27 until it corresponds to the increased pressure in chamber 16 allowing for the difference in the surface areas of the end faces of piston 14 bounding chambers 16 and 27. Thus the apparatus 5 acts as a pressure transformer and presents to the indicating instruments 6 a vacuum pressure relative to atmospheric which is lower in differential value by the ratio of the surface area of the end face 15 to the surface area of the end face 19, 20 of piston 14. The vacuum pressure presented to instrument 6 varies according to variations in the vacuum pressure in intake passage 1, but has a lower differential value. Thus, the apparatus 5 acts as a pressure transformer, transforming vacuum pressure by a selected ratio. In accordance with the invention, the ratio of pressure transformation corresponds to the ratio of the highest transmission gear to the next highest transmission gear.

When the transmission of the vehicle is placed in the highest operating gear, control means act on extension 17 of piston 14 and move the piston fully to the right in the drawing. The piston thereby covers the opening 24 to the atmosphere and connects the first and second pressure chambers 16 and 27 by means of annular channel 23 and passages 21 and 22. In this condition the pressure of the intake passage 1 is transmitted unreduced to the Bourdon tube 10 of the indicating instrument 6.

As has been previously noted, indication of fuel consumption is primarily of interest only at the most frequent operating condition of the vehicle. It is advisable to suppress indications of fuel consumption during idling or when other than the highest and next highest gears of the transmission are engaged, since such indications would confuse the vehicle operator. Suppression of the fuel consumption indication can be obtained in a simple manner using the apparatus of FIG. 1 by providing ventilation of the Bourdon tube 10. In order to achieve this, control elements may be provided which move piston 14 toward the left of the drawing by use of the piston extension 17. In this position of piston 14, the second chamber 27 is connected to vent passage 24 by annular channel 23 and passages 21 and 22. Thus, the indicating instrument 6 and Bourdon tube 10 are vented to the atmosphere, and thus will provide no display.

In order to provide the proper transformation of pressure for operation of the system in the highest transmission gear and the next highest transmission gear, the end face 15 of piston 14 has an area ratio to the end face 19, 20 bounding the second pressure chamber which corresponds to the ratio of the highest gear of the vehicle transmission to the next highest gear.

It should be further noted that according to the present invention the pressure transformer is changed to the appropriate condition for the highest gear, the second highest gear, and other gears without the use of any auxiliary energy, such as an electromagnetic activator to move the transformer between positions. Control of the transformer can be easily accomplished by connecting the piston extension 17 to linkage which is associated with the vehicle transmission, as will be further described.

Figure 2:
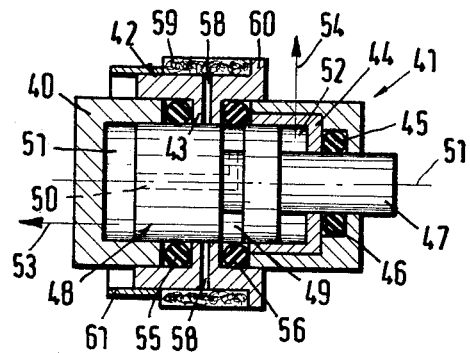
FIG. 2 is a cross-sectional view of a pressure transformer in accordance with the present invention, in an arrangement which is configured for ease of construction.

FIG. 2 is a cross sectional view of a pressure transformer constructed in accordance with the present invention which has an especially favorable design from the manufacturing standpoint. The FIG. 2 embodiment the pressure transformer is formed out of first and second pot-shaped members 40 and 41 with an intermediate toroidal ring 42 having a T-shaped cross section. The intermediate member 42 includes a web portion 43 which projects inwardly between the end faces of the pot-shaped members 40 and 41. There is also provided an insert 44 within pot-shaped member 41 which covers O-ring 46 which is inserted into an appropriate recess 45 in pot-shaped member 41 surrounding the piston extension 47. Insert 44 extends all the way to the end face of pot-shaped member 41 wherein it is sealed against O-ring 56. There is also provided an O-ring 55 for sealing pot-shaped member 40 against the toroidal ring member 42. Piston 48 is provided with an annular channel 49 and a duct 50. Thus, on either side of the piston 48 there are provided pressure chambers 51 and 52 respectively of which the first pressure chamber 52 is connected with an engine intake passage as indicated by 54, while the second pressure chamber 51 is connected with an indicating instrument as indicated by 53. The seals 55 and 56 located on alternate sides of the intermediate toroidal shaped member 42 act in the same manner as the edge seals provided in the transforming apparatus of FIG. 1. The flange-like sections of the intermediate piece 42, which extends parallel to the axis 57 of the transformer, cover both the sealing rings 55, 56 and the end zones of the pot-shaped parts 40 and 41 facing each other and may be connected to the pot-shaped members by adhesion or by snap connections. All of the parts of the transformer of FIG. 2, except the O-rings may be easily fabricated of injection molded plastic.

Intermediate piece 42 is provided with a duct 58 to provide a connection between the annular chamber 49 of piston 48 and the surrounding atmosphere. Toward the outside of the atmospheric vent 58 there is provided a filter 59 which is placed between a ring-shaped outer web 60 of the intermediate piece 42 and a fastening strap 61.

Figure 3:
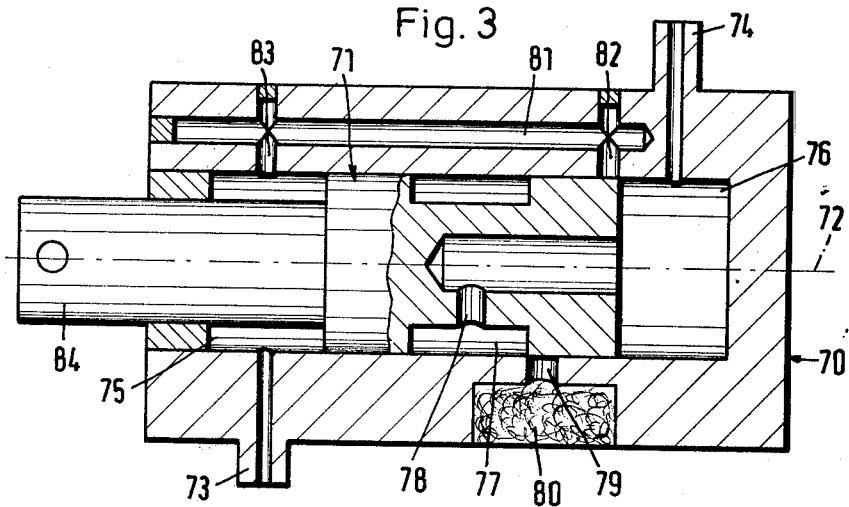
FIG. 3 is an alternate arrangement for a pressure transformer in accordance with the present invention.

FIG. 3 is a cross-sectional view of another transformer in accordance with the invention wherein the connection between chambers is provided by use of a passage in the cylinder wall. In the FIG. 3 embodiment, the cylinder 70 encloses a piston 71 which is arranged for displacement along its axis 72. A connection 73 is provided for connecting the first chamber 75 with the intake passage of an internal combustion engine. A second passage 74 is provided for connecting the second chamber 76 to a pressure indicating instrument. The piston 71 is provided with an annular channel 77 and ducts 78. An atmospheric vent 79 is provided in the wall of the cylinder and is separated from the atmosphere by filter material 80. There are also provided several ducts 81, 82 and 83, within the wall of the cylinder which connect the first pressure chamber 75 with the second pressure chamber 76. The annular channel 77, atmospheric vent 79, and channels 82 are arranged so that the piston 71 has an equilibrium position wherein the relative vacuum pressure in chamber 76 is a fraction of the relative vacuum pressure in chamber 75. The fraction corresponds to the ratio of the highest gear of the transmission of the vehicle to the next highest gear. If the piston moves to the left from the position indicated, a connection is formed between the two pressure chambers by way of the channels 82 in the cylinder. If the piston moves to the right in the drawing, chamber 76 is connected to the surrounding atmosphere by vent 79. In the FIG. 3 embodiment the piston extension 84 passes tightly through the end wall of the cylinder 70 and can be acted on by control elements whose design and coupling to the gear shifting arrangement will be described in the following example with reference to FIG. 4.

Figure 4:
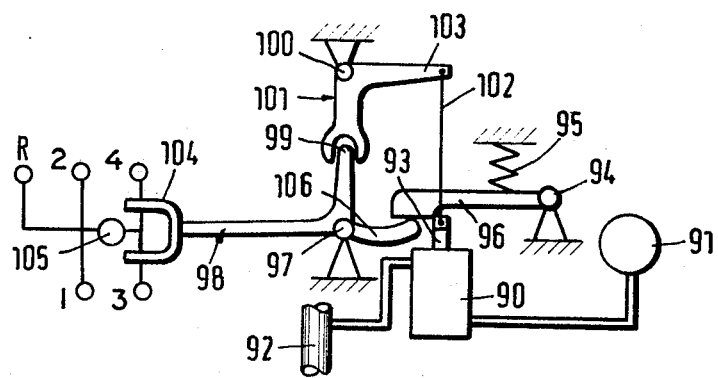
FIG. 4 is an illustration of a control system for the pressure transformer of the present invention.

In the schematic illustration of FIG. 4 the pressure transformer 90 is shown only schematically with the extension 93 of the piston operating in connection with various control elements. The illustration schematically shows a connection to an intake 92 of an internal combustion engine and another connection to an indicating instrument 91.

Two control elements are associated with the piston extension 93 in the control arrangement of FIG. 4. Lever 96, the first element, is acted upon by spring 95 to pivot about axis 94 and urge piston extension 93 inward. The second control element includes lever 98, pivoted at 97, and the angle lever 101, which is coupled by articulation at joint 99 to lever 98, and pivoted about axis 100. Arm 103 of angle lever 101 is connected by cable 102 to piston extension 93 and pulls the extension out when lever 101 is pivoted counterclock around axis 100. Lever 96 acts to push piston extension 92 in a downward direction under all conditions, except when lever extension 106 acts on lever 96 to remove the force of spring 95 from piston extension 93.

Lever 98 has a forked end 104 which cooperates with the gear shift lever 105 of the transmission. The circled figures in FIG. 4 are representative of the positions of gear shift lever 105 at which various transmission gears are engaged.

When the transmission lever 105 is in positions other than those corresponding to third or fourth gear, for example when the engine is idling, arm 103 of lever 101 does not pull piston extension 93 by cable 102, and pressure spring 95 acts by way of lever 96 to push piston extension 93 in a downward direction into the cylinder of the pressure transformer 90. By reference to FIG. 3 it can be seen that pressure chamber 76 will thereby be ventilated to the surrounding atmosphere, and accordingly indicating instrument 91 will register a very high rate of fuel consumption. It may be seen from FIG. 4 that the same condition will exist when the transmission is in first, second, or reverse gear. When third gear is engaged, lever 105 will rotate lever 98 in a counterclockwise direction, and cause lever 101 to rotate in a clockwise direction, moving arm 103 in a direction that releases any pull on piston extension 93. Extension arm 106 of lever 98 will also pivot about axis 97, and will thereby move lever 96 in a clockwise direction to relieve the pressure on piston extension 93 and allow the piston of the pressure transformer 90 to adjust itself to an equilibrium position wherein there is a transformation of the vacuum pressure in intake passage 92 to a lower value of vacuum pressure, which is supplied to indicating instruments 91.

When fourth gear of the transmission is engaged, lever 105 moves lever 98 in a clockwise direction about axis 97, and coupling 99 causes lever 101 to be moved in a counterclockwise direction so that lever extension 103 pulls on cable 102 and pulls the piston extension out of cylinder 90 in opposition to the force of spring 95. Moving piston extension 93 out of cylinder 90 will cause a connection between passage 82 and chamber 76 thereby connecting the first and second pressure chambers 75 and 76 within cylinder 70. Accordingly pressure from the intake passage 92 will be applied directly to the measuring instrument 91.

While there have been described what are believed to be the preferred embodiments of the invention, those skilled in the art will recognize that other and further modifications may be made thereto without departing from the spirit of the invention and is intended to claim all such embodiments as fall within the true scope of the invention.

I claim:

1. In a system for indicating the fuel consumption rate of a vehicle driven by an internal combustion engine through a multi-speed transmission, said system including a vacuum pressure responsive instrument for indicating consumption rate connected by a pressure conduit to an intake passage of said engine at a position of said passage following a throttle valve in the direction of intake flow, a pressure transformer in said conduit, responsive to the operating condition of said transmission, to operate when said transmission is in its next highest gear, to convert the negative pressure of said intake passage to a lower value of negative pressure to be presented to said indicating instrument, said conversion having a vacuum pressure ratio equal to the ratio of the highest gear in said transmission to the next highest gear in said transmission.

2. A pressure transformer as specified in claim 1 comprising a cylinder, a piston axially slideable within said cylinder and forming a first pressure chamber connected by said conduit to said intake passage and a second chamber connected by said conduit to said indicating instrument, said piston having first and second surfaces forming boundaries of said respective chambers, said surfaces having area ratios corresponding to said gear ratio, and passages, including an atmospheric vent on said cylinder for connecting said second chamber with said first chamber upon deflection of said piston in a first direction from an equilibrium position, and for connecting said second chamber with the surrounding atmosphere upon deflection of said piston in a second direction from said equilibrium position.

3. A pressure transformer as specified in claim 2 wherein said passages include an annular channel on said piston, wherein said channel is connected to said second chamber, wherein said cylinder has a step-like enlargement of its inner diameter in the first chamber, said chamber enlargement communicating with said annular channel on movement of said piston from said equilibrium position toward said first chamber, and wherein said atmospheric vent on said cylinder communicates with said annular channel on movement of said piston from said equilibrium position toward said second chamber.

4. A pressure transformer as specified in claim 2 wherein said first surface of said piston is in the form of an annular ring and surrounds a piston extension passing through an end wall of said cylinder, said extension being acted on upon engaging said highest gear of said transmission to move said piston to a position wherein said passages connect said first and second chambers and wherein said piston blocks said atmospheric vent.

5. A pressure transformer as specified in claim 4 wherein said extension is further acted upon by said transmission to move said piston to a position wherein said passages connect said second chamber to said atmospheric vent and said piston seals said first chamber when said transmission is not in said highest or said next highest gear.

6. A pressure transformer as specified in claim 5 wherein there is provided first control means, acting on said piston extension, for elastically urging said piston into a position wherein said second pressure chamber is vented to the atmosphere, and second control means, coupled to said transmission, for disengaging said first control means when said transmission is in its highest gear, and for moving said piston into a position connecting said first and second chambers when said transmission is in its next highest gear.

7. A pressure transformer as specified in claim 6 wherein said first control means includes a first lever acting under a spring force and connected to said piston extension and wherein said second control means includes second and third levers coupled by articulation, said second lever acting to support said first lever and said third lever acting on sid piston extension.

8. A pressure transformer as specified in claim 4 wherein said cylinder comprises first and second pot shaped members enclosing said first and second chambers and an intermediate toroidal member with a T shaped cross-section, said toroidal member having an inwardly facing circular web portion projecting between said pot shaped members.

9. A pressure transformer as specified in claim 8 wherein said toroidal member is connected to said pot shaped members by snap connections.

10. A pressure transformer as specified in claim 8 wherein there are provided sealing rings between the edges of said pot shaped members and said circular web portion.

11. A pressure transformer as specified in claim 8, 9 or 10 wherein said toroidal member includes said atmospheric vent, for communicating with said passages in selected positions of said piston.

12. A pressure transducer as specified in claim 8, 9 or 10 wherein said first pot shaped member is provided with a bore at one axial end accommodating said piston extension, wherein there is provided a recess surrounding said bore and accommodating an O-ring seal, and wherein there is provided an insert covering said O-ring and extending along the inner wall of said pot shaped member to said toroidal member.

13. A pressure transducer as specified in claim 8, 9 or 10 wherein said piston, said pot shaped members and said toroidal members comprise injection-molded parts.

* * * * *